United States Patent [19]

Couchoud et al.

[11] Patent Number: 5,883,195

[45] Date of Patent: *Mar. 16, 1999

[54] THERMOPLASTIC POLYAMIDE/-POLYETHERAMIDE/ELASTOMER ALLOYS HAVING IMPROVED MECHANICAL PROPERTIES

[75] Inventors: Jean-Jacques Couchoud, Saint-Sebastien De Morsent; Michel Glotin, Serquigny; Bernard Guerin, Bures-Sur-Yvette; Georges Parmeland, Pau, all of France

[73] Assignee: Atochem, Puteaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 882,299

[22] Filed: Jun. 25, 1997

Related U.S. Application Data

[63] Continuation of Ser. No. 558,413, Nov. 16, 1995, abandoned, which is a continuation of Ser. No. 297,714, Aug. 30, 1994, abandoned, which is a continuation of Ser. No. 942,079, Sep. 8, 1992, abandoned, which is a continuation of Ser. No. 734,108, Jul. 24, 1996, abandoned, which is a continuation of Ser. No. 336,526, Apr. 11, 1989, abandoned, which is a continuation of Ser. No. 947,871, Dec. 30, 1986, abandoned.

[30] Foreign Application Priority Data

Dec. 30, 1985 [FR] France ................................. 85 19421

[51] Int. Cl.$^6$ ............................ C08L 77/00; C08L 67/02; C08G 63/48

[52] U.S. Cl. ......................... 525/183; 525/66; 525/92 A; 525/167; 525/179

[58] Field of Search ................................ 525/66, 92 A, 525/167, 179

[56] References Cited

U.S. PATENT DOCUMENTS

| 3,267,175 | 8/1966 | Grabowski . |
| 3,796,771 | 3/1974 | Owens et al. . |
| 4,218,549 | 8/1980 | Jadamus et al. . |
| 4,321,336 | 3/1982 | Meyer et al. . |
| 4,362,846 | 12/1982 | Korber et al. . |
| 4,381,371 | 4/1983 | Nienlinger et al. . |
| 4,977,213 | 12/1990 | Giroud-Abel et al. .................. 525/66 |

FOREIGN PATENT DOCUMENTS

| 0135218 | 3/1985 | European Pat. Off. . |
| 2532653 | 2/1984 | France . |
| 0047349 | 3/1982 | Japan ..................................... 525/183 |
| 60-23435 | 2/1985 | Japan ..................................... 525/183 |
| 60-170646 | 9/1985 | Japan ..................................... 525/184 |
| 998439 | 7/1965 | United Kingdom . |
| 2093469 | 9/1982 | United Kingdom . |

*Primary Examiner*—P. Hampton-Hightower
*Attorney, Agent, or Firm*—Burns, Doane, Swecker & Mathis, L.L.P.

[57] ABSTRACT

Novel thermoplastic polymer alloys adopted for easy conversion, e.g., by injection molding or extrusion techniques, into useful shaped articles having improved mechanical properties, for example, high impact strengths, include a polyamide, e.g., nylon 6 or nylon 12, a thermoplastic elastomer, e.g., ABS, MBS or EPDM, and a polyetheramide, advantageously a polyetheresteramide.

2 Claims, No Drawings

THERMOPLASTIC POLYAMIDE/POLYETHERAMIDE/ELASTOMER ALLOYS HAVING IMPROVED MECHANICAL PROPERTIES

This application is a continuation of application Ser. No. 08/558,413, filed Nov. 16, 1995, now abandoned, which is a continuation of Ser. No. 08/297,714 filed Aug. 30, 1994, abandoned, which is a continuation of Ser. No. 07/942,079 filed Sep. 8, 1992, abandoned, which is a continuation of Ser. No. 07/734,108 filed Jul. 29, 1991, abandoned, which is a continuation of Ser. No. 07/336,526 filed Apr. 11, 1989, abandoned, which is a continuation of Ser. No. 06/947,871 filed Dec. 30, 1986, abandoned.

BACKGROUND OF THE INVENTION

1. Field of the Invention

The present invention relates to novel thermoplastic polymer blends, and, more especially, to certain polyamide/polyetheramide/thermoplastic elastomer alloys which are easily molded or extruded into useful shaped articles having enhanced impact strength.

2. Description of the Prior Art

Shaped articles comprised of polyamides, whether molded or extruded, are widely used for numerous applications requiring excellent mechanical properties, notably a very high impact strength.

As the requirements in this respect have been steadily increasing, various means have been proposed to this art to improve impact strength. Particularly representative of such means is the addition to polyamides of certain polymers which are clearly elastomeric in nature.

Exemplary of such impact modified polymers, the following are representative:

(a) Copolymers, whether or not graft polymers and whether or not crosslinked, based essentially on butadiene, styrene and acrylonitrile (U.S. Pat. Nos. 3,134,746, 3,218,371, 3,267,175, 4,381,371);

(b) Copolymers based on monoolefins, more particularly on ethylene and acrylic acid, methacrylic acid, vinyl acetate, and the like (DE-AS 19,08,468, 27,13,537, British Patent No. 998,439, U.S. Pat. No. 4,362,846, published Japanese application No. 15.5318);

(c) Copolymers of ethylene, propylene and diene, designated EPDM, the diene in most cases being 1,3-butadiene or isoprene [NL 83.02602, Stamicarbon; *KUNSTSTOFFE*, 75, 3, p. 160 (1985)];

(d) Copolymers, whether or not graft polymers and whether or not crosslinked, based essentially on methyl methacrylate, butadiene and styrene (U.S. Pat. Nos. 3,668,274, 3,796,771, 3,984,497, published Japanese application No. 76.87138);

(e) Mixtures of polyolefins, copolymers of butadiene and acrylonitrile (DE-OS 27,34,693);

(f) Chlorinated polyethylene elastomers (U.S. Pat. No. 4,207,404);

(g) Nitrile rubbers, such term designating essentially copolymers of 1,3-butadiene or isoprene with acrylonitrile (EP 131,113 A).

SUMMARY OF THE INVENTION

A major object of the present invention is to improve the impact strength of the binary elastomeric polyamide compositions heretofore known to this art.

Briefly, this invention features incorporating a third component, a polyetheramide, into the binary polyamide blends. The resulting ternary compositions may be considered alloys because of their homogeneity.

DETAILED DESCRIPTION OF THE PREFERRED EMBODIMENTS OF THE INVENTION

More particularly according to the present invention, the subject alloys are advantageously ternary compositions of 30 to 94.8 parts by weight of polyamide, 0.2 to 65 parts by weight of polyetheramide and 5 to 50 parts of the elastomer, with the sum of the three components being equal to 100.

In addition to these three essential components, the subject alloys may contain the usual additives and adjuvants, such as plasticizers, heat and light stabilizers, fillers such as glass fibers, carbon fibers, and the like.

By the term "polyamide" are intended those polymers resulting from the polycondensation of one or more aminoacids, such as the aminocaproic acid, 7-aminoheptanoic acid, 11-aminoundecanoic acid, 12-aminododecanoic acid, and the like, or of one or more lactams, such as caprolactam, oenantholactam, lauryllactam, and the like, or of one or more salts or mixtures of diamines, such as hexamethylenediamine, dodecamethylenediamine, meta-xylylenediamine, bis-p-aminocyclohexylmethane, trimethylhexamethylenediamine, and the like, with dicarboxylic acids, such as isophthalic acid, terephthalic acid, adipic acid, azelaic acid, suberic acid, sebacic acid, dodecanedicarboxylic acids, and the like, or any mixtures of such monomers which form copolyamides.

By the term "polyetheramide" are intended both the statistical polyetheramides (namely, those having random chain lengths of their different monomeric constituents) and sequential polyetheramides comprising recurring polyetheramide sequences constituted by block segments of varying chain lengths of the different constituents thereof, e.g., polyamide blocks and polyether blocks.

Sequential polyetheramides result from the copolycondensation of polyamide sequences having reactive end groups, with polyether sequences having reactive end groups, such as, for example:

(1) Polyamide sequences having terminal amino groups at each end of the polymer chain with polyoxyalkylene sequences having terminal carboxylic acid groups at each end of the polyether chain;

(2) Polyamide sequences having terminal carboxylic acid groups at each end of the polyamide chain with polyoxyalkylene sequences having terminal amino groups at each end of the polyether chain, prepared by cyanoethylation and hydrogenation of aliphatic alpha, omega-dihydroxy polyoxyalkylenes, designated polyetherdiols; and (3) Polyamide sequences having terminal carboxylic acid groups at each end of the polyamide chain with such polyetherdiols, the resulting polyetheramides being polyetheresteramides.

The composition and preparation of such polyetheresteramides is described in French Patents Nos. 74.18913 and 77.26678, and in U.S. Pat. Nos. 4,331,786 and 4,332,920, assigned to the assignee hereof and incorporated herein by reference. Representative such polyetheresteramides to be alloyed with the polyamides advantageously have a molecular weight in excess of 10,000, a melting point of from 80° to 210° C., and are comprised of from about 85 to 15% by weight of carboxylated polyamide or copolyamide blocks having a molecular weight of from about 300 to 15,000, desirably from about 600 to 5,000, and from about 15 to 85% by weight of hydroxylated polyether blocks having a molecular weight of from about 100 to 6,000, desirably from about 200 to 3,000. Exemplary polyamides are nylon 6, nylon 11 and nylon 12, and a representative polyetherdiol is polyoxytetramethylene glycol.

By "elastomers" are intended those impact modified polymers noted in the above paragraphs (a), (b), (c), (d), (e), (f) and (g) and, more generally, all of the thermoplastic elastomers resulting from the statistical or sequential copolymerization, either with or without grafting, or with or without crosslinking, of at least two unsaturated comonomers, such as the olefins, e.g., ethylene, propylene, etc., an alkyl acrylate, methacrylate, acrylonitrile, etc., a conjugated diene, such as butadiene, isoprene, etc.

As set forth above, these elastomers may be crosslinked, provided that they remain thermoplastic.

The alloys of the invention may also be prepared from one or more polyamides, one or more polyetheramides, and one or more elastomers.

The alloys according to the invention may be converted into molded shaped articles by the conventional methods of injection, extrusion or compression molding techniques, e.g., into tubes, films, cable coatings, and the like.

In addition to their very high impact strength at ordinary or low temperatures, the subject alloys have other valuable properties, e.g., flexibility, elasticity, low hardness, characteristics which may be varied by adjusting the nature and percentage of the components. Generally, the polyetheramides and the elastomers are more flexible, more elastic and have a lower hardness than the polyamides.

The alloys of the invention are prepared by intermixing the three principal components in the molten state (optionally in the presence of the additives and adjuvants listed above) and cooling the admixture which results.

The operation may be carried out in any apparatus assuring good mixing, such as a single or double screw extruder, planetary or nonplanetary co-mixer. Such apparatus may be supplied with a mixture, previously prepared dry at ordinary temperatures, for example, in a barrel, or the mixer may be supplied with separately introduced components.

The working temperatures should be such that the three components are well melted, but should not be excessively high, as this would cause decomposition and reduce the degree of intermixing by lowering the viscosity of the melt.

In order to further illustrate the present invention and the advantages thereof, the following specific examples are given, it being understood that same are intended only as illustrative and in nowise limitative.

In said examples to follow, the alloys were prepared in a type PR 46 "co-mixer" of the Swiss Company, BUSS AG.

This apparatus was equipped at its distal end with a multiple hole die having cylindrical orifices 4 mm in diameter. The mixer continuously produced a plurality of liquid streams which were solidified and cooled by immersion in a tank of cold water, prior to their being conveyed to a granulator.

The resulting granules were carefully dried and used to mold the specimens required for the impact tests.

Two types of impact tests were carried out:
(i) CHARPY impact tests according to the ISO 179 standard on U-notched 4×6×50 mm specimens,
(ii) IZOD impact tests according to the ISO 170 standard on V-notched 6.4×12.7×63.5 mm specimens.

The rupture energies were expressed, in both cases, in $KJ.m^{-2}$.

EXAMPLE 1

The alloys were prepared from the following three principal components:
(1) POLYAMIDE:

Two batches of nylon 12 were used, one having an inherent viscosity of $1.15$ $dl.g^{-1}$, designated hereinafter by the abbreviation PA 12-115, the other having an inherent viscosity of $1.65$ $dl.g^{-1}$, designated hereinafter as PA 12-165.

The inherent viscosities were measured at 25° C. on a solution of 0.5 g polymer in 100 g meta-cresol.
(2) POLYETHERAMIDE:

Two sequential polyetheresteramides were used, namely:

The first, designated by the abbreviation PA 12 PTMG-1, was prepared by polycondensation according to the technique described in French Patent No. 74.18913, of 67 parts by weight of a terminally dicarboxylated polyamide 12 prepolymer (obtained from lauryllactam and adipic acid) having a molecular weight of 200, with 33 parts by weight of polyoxytetramethylene glycol (PTMG) having a molecular weight of 1,000, with the resulting polyetheresteramide having an inherent viscosity of $1.60$ $dl.g^{-1}$, measured at 25° C. on a solution of 0.5 g polymer in 100 g meta-cresol;

The second, PA 12 PTMG-2, prepared by polycondensation carried out in the same manner, of 30 parts by weight of a prepolymer of adipic polyamide 12, having a molecular weight of 850, with 70 parts of PTMG having a molecular weight of 2,000.

The inherent viscosity was equal to $1.80$ $dl.g^{-1}$.
(3) ELASTOMER:

The following elastomers were used, namely:

(i) An MBS (graft copolymer based on butadiene, methyl methacrylate and styrene): PARALOID KM 653 marketed by Rohm & Haas Co. (solubility measurements in toluene indicated that this elastomer was weakly crosslinked).

(ii) An ABS (graft copolymer based on acrylonitrile, butadiene and styrene): BLENDEX 310 S marketed by Borg-Warner Co.

(iii) A copolymer based on butadiene, butyl acrylate and methyl methacrylate: DURASTRENGTH D 200 marketed by M&T Chemicals Co.

(iv) An EPDM (ethylene, propylene, dienes, monomers): VISTALON 1721 marketed by Esso-Chimie.

(v) An NBR (rubber based on butadiene and acrylonitrile): CHEMIGUM P 756 C marketed by Goodyear.

The hopper of the co-mixer was charged with the mixture of the three components prepared in advance by dry mixing, in a barrel, of granules of polyamide and polyetheramide with the elastomer powder or granules, with the percentage of each of the components being indicated in the Tables I and II which follow.

The temperatures inside the co-mixer were a maximum of 230° C., if the polyamide was PA 12-115, and a maximum of 245° C., if the polyamide was PA 12-165.

For example, for the mixture of PA 12-115, PTMG-1, MBS, 75-5-20, the temperatures prevailing in the co-mixer, measured in 6 zones from the inlet to the outlet, were:

195° C.–200° C.–230° C.–230° C.–230° C.–215° C.

For the mixture of PA 12-165, PTMG-1, EPDM, 75-5-20, the temperatures were:

185° C.–200° C.–245° C.–245° C.–245° C.–225° C.

The results of the impact tests carried out on injection molded specimens from the granules of the alloys recovered from the co-mixer are reported in the following Tables I and II and show clearly that the impact strength of the polyamides, which is only slightly increased by the single addition of either the polyetheresteramide or the elastomer, is considerably increased by the simultaneous addition of the two components.

In addition to the very high impact strength, the alloys according to the invention are characterized by an excellent resistance to hydrocarbons, which enables their use in applications involving direct contact with petroleum products.

(iii) A sequential polyetheresteramide, designated as PA 6-PPG, prepared by polycondensation according to the technique described in French Patent No. 74.18913, of 68 parts by weight of a terminally dicarboxylated nylon 6 having a molecular weight of 1300, with 32 parts by weight of polyoxypropylene glycol (PPG) having a molecular weight of 600.

The polyetheresteramide (iii) had an inherent viscosity of 1.10 $dl.g^{-1}$, measured at 25° C. on a solution of 0.5 g polymer in 100 g of meta-cresol.

The temperatures inside the extruder were a maximum of 270° C. For example, regarding the mixture B, the temperatures prevailing in the extruder, measured in 4 zones from the inlet to the outlet, were:

TABLE I

| Alloy Compositions | | | | | | CHARPY notched impact strength, in $KJ.m^{-2}$ | | |
|---|---|---|---|---|---|---|---|---|
| POLYAMIDE | | POLYETHERAMIDE | | ELASTOMER | | | | |
| Nature | Parts | Nature | Parts | Nature | Parts | -40° C. | -20° C. | +23° C. |
| PA 12-115 | 100 | | 0 | | 0 | 3.8 | 4.3 | 6.8 |
| PA 12-115 | 95 | PTMG-1 | 5 | | 0 | 4.7 | 4.9 | 10.8 |
| PA 12-115 | 90 | PTMG-1 | 10 | | 0 | 5.5 | 5.8 | 11.5 |
| PA 12-115 | 80 | | 0 | MBS | 20 | 4.1 | 6.8 | 14 |
| PA 12-115 | 75 | PTMG-1 | 5 | MBS | 20 | 13.4 | does not break | does not break |
| PA 12-115 | 70 | PTMG-1 | 10 | MBS | 20 | 14 | does not break | does not break |
| PA 12-115 | 98 | PTMG-2 | 2 | | 0 | 4.5 | 4.6 | 9.0 |
| PA 12-115 | 78 | PTMG-2 | 2 | MBS | 20 | 8 | 22 | does not break |
| PA 12-115 | 95 | PTMG-2 | 5 | | 0 | 5.0 | 5.3 | 11 |
| PA 12-115 | 75 | PTMG-2 | 5 | MBS | 20 | 12 | does not break | does not break |
| PA 12-115 | 80 | | 0 | ABS | 20 | 4.8 | 7 | 15 |
| PA 12-115 | 75 | PTMG-1 | 5 | ABS | 20 | 9 | 12 | does not break |
| PA 12-115 | 80 | | 0 | ACRYL | 20 | 4.6 | 7.2 | 14 |
| PA 12-115 | 75 | PTMG-1 | 5 | ACRYL | 20 | 12.3 | 21 | does not break |

TABLE II

| Alloy Compositions | | | | | | IZOD impact tests, in $KJ.m^{-2}$ | |
|---|---|---|---|---|---|---|---|
| POLYAMIDE | | POLY-ETHERAMIDE | | ELASTOMER | | | |
| Nature | Parts | Nature | Parts | Nature | Parts | -40° C. | -20° C. |
| PA 12-165 | 100 | | 0 | | 0 | 4.5 | 7.6 |
| PA 12-165 | 95 | PTMG-1 | 5 | | 0 | | 10.9 |
| PA 12-165 | 90 | PTMG-1 | 10 | | 0 | | 14.2 |
| PA 12-165 | 80 | | 0 | EPDM | 20 | | 21.3 |
| PA 12-165 | 75 | PTMG-1 | 5 | EPDM | 20 | | 32.9 |
| PA 12-165 | 70 | PTMG-1 | 10 | EPDM | 20 | | 37 |
| PA 12-165 | 80 | | 0 | NBR | 20 | 9 | 17 |
| PA 12-165 | 75 | PTMG-1 | 5 | NBR | 20 | 12 | 23 |
| PA 12-165 | 70 | PTMG-1 | 10 | NBR | 20 | 13 | does not break |

EXAMPLE 2

The mixtures A, B, C and D set forth in the following Table III were prepared in a double screw extruder, Werner and Pfleiderer Z SK 53, from the following three principal components:

(i) Nylon 6 having an inherent viscosity of 1.15 $dl.g^{-1}$, designated as PA 6-115; the inherent viscosity was measured at 25° C. on a solution of 0.5 g polymer in 100 g of meta-cresol;

(ii) An EVA polymer prepared by high pressure copolymerization of ethylene, vinyl acetate (VA) and maleic anhydride (MA), marketed by Atochem as OREVAC 9 307 (14% VA, 3500 ppm MA), designated as EVA MA;

200° C.–240° C.–270° C.–240° C.

For the mixtures A, B and C, the polyetheresteramide was added by mechanical mixing with the PA 6-115/EVA MA.

Regarding the mixture D, the three components were introduced together into the extruder.

The resulting granules were carefully dried and used to mold the specimens (4×6×50 mm) required for the CHARPY impact tests, according to ISO 170 standard.

The impact test results which are reported in the following Table III clearly show the influence of introduction of the polyetheresteramide on the mixtures PA 6-115/EVA MA.

TABLE III

| | PA 6-115 (parts by weight) | EVA MA (parts by weight) | PA 6-PPG (parts by weight) | Impact Strength, in $KJ.m^{-2}$ | |
|---|---|---|---|---|---|
| | | | | -40° C. | +20° C. |
| A | 90 | 10 | — | 5.3 | 19.9 |
| B | 85 | 10 | 5 | 6.3 | does not break |
| C | 80 | 10 | 10 | 5.8 | does not break |
| D | 80 | 10 | 10 | 7.4 | does not break |

By scanning electron microscopy, a dispersion of very fine particles of EVA (diameters ranging from 1000 to 3000 angstroms) was observed in the mixtures containing the polyetheresteramide, in contrast to the alloys without polyetheresteramide (diameters ranging from 1 to 3 microns).

The mode of introduction of the polyetheresteramide has little influence on the morphology and mechanical properties of the alloy.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermoplastic polymer alloy comprising a polyamide in an amount of 70 to 94.8 parts by weight, a polyetheramide block copolymer with polyamide blocks and polyether blocks in an amount of 0.2 to 10 parts by weight, and a thermoplastic elastomer comprising at least two unsaturated comonomers, wherein said comonomers comprise an olefin, alkyl acrylate, alkyl methacrylate, acrylonitrile, or conjugated diene in an amount of 5 to 20 parts by weight with the sum of the polyamide, polyetheramide, and the thermoplastic elastomer being equal to 100 parts by weight.

2. The alloy of claim 1 further comprising an adjuvant, a plasticizer, a heat stabilizer, a light stabilizer, or filler, or mixture thereof.

* * * * *